United States Patent Office 3,508,888
Patented Apr. 28, 1970

3,508,888
HYDROXY-TRIPHENYLAMINES AS ANTI-
OZONANTS FOR RUBBER AND GASOLINE
Ronald B. Spacht, Kent, Ohio, assignor to The Goodyear
Tire & Rubber Company, Akron, Ohio, a corporation
of Ohio
No Drawing. Filed Dec. 26, 1963, Ser. No. 333,702
Int. Cl. C10i 1/22; C08f 45/60; C07c 87/50
U.S. Cl. 44—75         7 Claims This invention relates to the preservation of organic materials normally susceptible to oxidation, and more particularly concerns the provision of oxidation inhibitors which are useful as age resistors for conjugated diene rubbers, olefinic gasolines, and similar oxidizable materials.

Olefinically unsaturated organic materials, such as natural and the various synthetic rubbers, and olefinic gasolines, are subject to quality deterioration upon aging. Factors such as atmospheric oxygen, sunlight, ozone, the presence of heavy metals, etc., cause reaction at the olefinic bonds with a resultant quality deterioration. In the case of rubbers, aging decreases tensile strength, reduces flexibility, and tends to form cracks. Gasolines and similar unsaturated hydrocarbon liquids tend to form gummy materials which foul the vehicle engines.

An object of the present invention is to provide oxidation inhibitors suitable for use with a variety of oxidizable organic materials. Another object is to provide inhibitors which are particularly effective for inhibiting oxidation of natural and synthetic rubber. A further object is to provide oxidation inhibitors for olefinic hydrocarbons, particularly gasoline. Additional objects are to provide inhibitors, or age resistors, which reduce or prevent deterioration from oxygen, ozone, sunlight, heavy metals, and related causes. Other and further objects will be apparent as the description of this invention proceeds.

Briefly, in accordance with the invention, it has been discovered that organic materials normally susceptible to oxidation may be inhibited against oxidation by incorporating a small amount of a triphenylamine having at least one p-hydroxy group and having no additional ring substituents other than optional alkyl groups. The inhibitors thus have the essential structural nucleus:

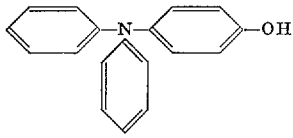

thus at least one of the phenyl rings has a hydroxy group para to the nitrogen atom. One or more alkyl groups may be on any one or more of the phenyl rings, irrespective of whether the ring is one having a para hydroxy group.

Inhibitors of the invention are particularly suitable for use with natural or synthetic conjugated diene rubbers. These rubbers are normally susceptible to deterioration by sunlight and atmospheric oxygen, and are either natural or synthetic elastomeric polymers or copolymers of conjugated dienes. Representative examples of synthetic rubbery polymers of conjugated dienes include: polychloroprene; polyisoprene having essentially all of its units combined in a cis-1,4 structure (Mayor et al.: Rubber and Plastic Age, volume 39, No. 11, page 938, 1958); polybutadiene having essentially all of its units combined in a cis-1,4 structure (Crouch: Rubber and Plastic Age, pages 276–282, March 1961); the rubbery copolymers of butadiene and styrene which may contain from 50 to 90 percent or more of butadiene; butyl rubber, a copolymer of a major proportion of a mono-olefin and a minor proportion of a multi-olefin, such as butadiene or isoprene; terpolymers of octadiene or dicyclopentadiene with ethylene and propylene; and copolymers of acrylonitrile and butadiene. All of the foregoing polymers have residual unsaturation which renders them vulnerable to aging.

The present inhibitors may be used in conjunction with gasolines or other hydrocarbon liquids containing olefinic constituents. Such liquids include kerosene, distillate fuel oils, diesel oils, etc.

The inhibitors may also be used with other organic materials susceptible to oxidation or aging, including comestibles, fats, waxes, thermoplastic materials exposed to the atmosphere, such as polyethylene electrical insulation, etc.

When employed in natural or synthetic rubbers, inhibitors of the invention are incorporated at concentrations depending on the nature of the rubber base stock, the expected environment of use, and the required degree of protection. In general, concentrations ranging from as low as about .025 part by weight per 100 parts of rubber polymer, to as high as about ten parts per 100 parts, are advantageously used. When it is desired to afford long term protection in severe applications, for exampl in vehicle tires, the preferred range is from about 0.05 to about four parts per 100 parts.

When employed in oxidizable hydrocarbons, such as gasoline, the concentration may be reduced significantly. Ordinarily, an effective concentration will fall between about 0.001 to about 0.1 weight percent, but this may be varied, depending on conditions and stock. In general, concentrations of from about 0.001 to about ten percent by weight will encompass the range of interest for virtually all oxidizable materials.

The inhibitors of the present invention are readily produced from available feedstocks. Depending on whether it is desired to produce the monohydroxy triphenylamine or the di- or trihydroxy material, a hydroquinone is condensed with the corresponding diphenylamine, p-hydroxy diphenylamine, or p,p'-dihydroxy diphenylamine. The reactants may be unsubstituted, or may contain alkyl substituents, as, for example, when tolyl hydroquinone, t-butyl hydroquinone, or the alkylated hydroxy diphenylamines of United States Patent 2,780,647 are used.

The condensation reaction occurs readily at temperatures between about 150 and about 300° C. Water is evolved during condensation and may be collected by installing a separator in the reflux system.

An acid catalyst is used during condensation. Phosphoric acid is effective, but in certain circumstances such Friedel-Crafts catalysts as ferric, zinc, or aluminum chlorides, or boron trifluoride, may be preferred.

The invention, in its various aspects, is illustrated by the following examples, which are intended to be illustrative only, and hence not wholly definitive with respect to scope or conditions.

EXAMPLE I

This example illustrates the preparation of p-hydroxy triphenylamine. One hundred ten grams of hydroquinone and 334 grams of diphenylamine, together with 7 grams of orthophosphoric acid catalyst are placed in a flask equipped with a water separation condenser arranged to remove water continuously. The flask is heated to a temperature between 250 and 260° C. and maintained at that range for seven hours. 20.5 ml. of water is obtained.

At the end of the reaction, the mixture is distilled under vacuum. One mol of unreacted diphenylamine is recovered. Product p-hydroxy-triphenylamine is obtained between 200 and 225° C. at 1 millimeter pressure at a yield of 171.0 grams. The product is recrystallized from a 50—50 mixture of alcohol and water. Its melting point is 128.5–129.5° C. Its nitrogen content is 5.33 weight percent; theory for p-hydroxy triphenylamine is 5.36 percent.

EXAMPLE II

This example illustrates the preparation of p,p'-dihydroxy triphenylamine. One hundred eighty-five grams of p-hydroxy diphenylamine, 110 grams hydroquinone, and 7.0 grams $H_3PO_4$ are placed in the flask of Example I and heated at 230–235° C. for three hours. 18 ml. of water is formed and collected.

The reaction mixture is then dissolved in aqueous caustic and acidified to Congo Red paper. The resulting product is filtered and washed in water. The yield is 220 grams of p,p'-dihydroxy triphenylamine, having a melting point of 105–120° C.

EXAMPLE III

This example further illustrates the preparation of p,p'-dihydroxy triphenylamine but employing different proportions of reagents and a modified workup procedure.

One hundred eight-five grams p-hydroxy diphenylamine, 220 grams hydroquinone, and 3.5 grams phosphoric acid are charged to the flask of Example I and heated for two hours between 230 and 250° C., at which time the theoretical water is collected.

The reaction mass is cooled and then admixed with hot toluene. A residue of 305 grams of material is extracted twice with hot water, leaving a final residue of 188.0 grams of material having a melting point of 205–209° C.

After recrystallization of the above residue from toluene and methanol, a solid having a melting point of 220–223° C. is isolated. The percent nitrogen is 4.90; theory is 5.3 weight percent.

EXAMPLE VI

This example illustrates the preparation p,p',p''-trihydroxy triphenylamine. Two hundred one grams p,p'-dihydroxy diphenylamine (prepared by reacting para amino phenol at 185° C. with an iodine catalyst), 220 grams hydroquinone, and 3.5 grams $H_3PO_4$ are placed in the flask of Example I and heated between 200 and 230° C. for three hours, at which time the theoretical water is eliminated. Upon cooling, the mixture sets to a hard crystalline mass. By extraction with a mixture of isopropanol and water, 82.0 grams of p,p',p''-trihydroxy triphenylamine are obtained. Further recrystallization from hot water gives a product having a melting point of 237–239° C. It contains 4.76 weight percent nitrogen; theory is 4.76 percent.

* * * * *

The hydroxy triphenylamines are tested for their effectiveness for inhibiting oxidation of several organic materials which, due to their olefinic nature, are normally susceptible to oxidative degradation when exposed to the atmosphere. The designation "R.P." refers to a "reaction product" prepared as in the foregoing examples, but eliminating product workup steps.

Gasoline antioxidant test

Inhibitors of the invention are tested for their effectiveness as antioxidants for gasoline according to A.S.T.M. standard test D–525. In this test, a sample composed of mixed catalytic and thermal cracked gasolines is admixed with 0.025 gram per liter of inhibitor, and exposed in an oxygen bomb at 100° C. The time necessary for the pressure to drop to a predetermined level, termed the "induction period," is taken as a measure of inhibitor effectiveness.

The data are summarized below.

| Example | Inhibitor | Induction Period, minutes |
|---|---|---|
| | None | 202 |
| | Phenyl-beta-naphthylamine (standard) | 238 |
| I | p-Hydroxy triphenylamine | 340 |
| II | R.P.[1] p-hydroxy diphenylamine and hydroquinone | 432 |
| IV | p,p',p''-Trihydroxy triphenylamine | 588 |

[1] Unpurified reaction product.

Tread stock oxidation test

A natural rubber tread stock is used to determine the effectiveness of oxidation inhibitors under accelerated and normal aging (oxidation) conditions. The following formulation is used:

| Component: | Parts by weight |
|---|---|
| Smoked sheet | 100.0 |
| Zinc oxide | 3.25 |
| Carbon black (high abrasion, furnace) | 50.75 |
| Sulfur | 2.75 |
| Stearic acid | 3.50 |
| Pine tar | 3.00 |
| Mercaptobenzothiazole | 1.35 |
| Inhibitor | 1.00 |

The stock is cured for 70 minutes at 275° F. (135° C.) in the form of 0.080 sheet. Samples are aged in an air bomb at 120° C. and 80 p.s.i.g. pressure, and the following tests are conducted on samples before and after aging:

*Tensile strength.*—A standard dumbbell having a center portion 0.398 inch wide by 3.5 cm. long is aged for 24 hours at 77° F. (24.4° C.) and 50 percent relative humidity. It is pulled at a rate of 30 inches per minute. Tensile strength at break is reported in pounds per square inch. "%TR" is percent tensile strength retention.

*Sixty-six percent flex.*—A 0.9-inch sample with an 0.3-inch hole in the center is flexed from a relaxed position to 66 percent stretch at 360 cycles per minute at room temperature. Results are expressed as minutes to break.

Samples are also exposed to direct sunlight for month (per Fielding: India Rubber World, vol. 115, pp. 802–805, 1947) under both static (stretched to 15–30 percent elongation) and kinetic (10–21 percent elongation, 58 cycles per minute) conditions. A rating of zero indicates no cracking, one is slight cracking, two is moderate cracking, three is heavy cracking, and four is severe cracking or breaking.

The following results are observed:

| Example | Inhibitor | Tensile Strength | | | 66% Flexibility | | Weathering | |
|---|---|---|---|---|---|---|---|---|
| | | Original | Aged | Percent TR | Original | Aged | Static | Kinetic |
| | None | 3,950 | 1,050 | 26 | 66 | 29 | 3+ | 3– |
| | PBNA[1] | 4,050 | 1,550 | 38 | 112 | 35 | 2+ | 1 |
| I | p-Hydroxytriphenylamine | 4,000 | 1,850 | 46 | 138 | 51 | 3 | 1+ |
| | None | 4,100 | 1,225 | 30 | 66 | 29 | 3+ | 3– |
| | PBNA | 3,950 | 1,600 | 40 | 112 | 35 | 2+ | 1 |
| II | p,p'-Dihydroxytriphenylamine[2] | 4,200 | 1,500 | 36 | 121 | 81 | | |
| | None | 3,950 | 1,050 | 26 | 66 | 29 | 3+ | 3– |
| | PBNA | 4,000 | 1,450 | 36 | 112 | 35 | 2+ | 1 |
| II | p,p'-Dihydroxytriphenylamine | 3,850 | 1,305 | 35 | 129 | 61 | 2 | 2 |
| IV | p,p',p''-Trihydroxytriphenylamine | 4,000 | 1,550 | 39 | 100 | 56 | 2 | 2 |

[1] Phenyl-beta-naphthylamine standard.
[2] Unpurified reaction product.

The following compounds are further illustrative of those within the present invention:

4-hydroxy triphenylamine,
4-hydroxy-4'-methyl triphenylamine,
4-hydroxy-4',4''-dimethyl triphenylamine,
4-hydroxy-2'-methyl triphenylamine,
4-hydroxy-2',2''-dimethyl triphenylamine,
4-hydroxy-2',4'-dimethyl triphenylamine,
4-hydroxy-3'-methyl triphenylamine,
4-hydroxy-3',3''-dimethyl triphenylamine,
4-hydroxy-2-methyl triphenylamine, 4-hydroxy-2,4'-dimethyl triphenylamine, and homologues thereof such as the ethyl, propyl, n-butyl, isobutyl, t-butyl and isopropyl;
4,4'-dihydroxy triphenylamine,
4,4'-dihydroxy-4''-methyl triphenylamine,
4,4'-dihydroxy-2'-methyl triphenylamine,
4,4'-dihydroxy-3''-methyl triphenylamine,
4,4'-dihydroxy-2,2'-dimethyl triphenylamine,
4,4'-dihydroxy-2,2',2''-trimethyl triphenylamine,
4,4'-dihydroxy-2,4'-dimethyl triphenylamine,
4,4'-dihydroxy-4',3''-dimethyl triphenylamine, and homologues thereof as above;
4,4',4''-trihydroxy triphenylamine,
4,4',4''-trihydroxy-2-methyl triphenylamine,
4,4',4''-trihydroxy-3-methyl triphenylamine,
4,4',4''-trihydroxy-2,2''-dimethyl triphenylamine,
4,4',4''-trihydroxy-2,3'-dimethyl triphenylamine,
4,4',4''-trihydroxy-3,3''-dimethyl triphenylamine,
4,4',4''-trihydroxy-2,2',2''-trimethyl triphenylamine,
4,4',4''-trihydroxy-3,3',3''-trimethyl triphenylamine, and homologues thereof as above.

Thus it is apparent that there has been provided, according to the invention, an outstanding inhibitor against oxidation of organic materials normally susceptible thereto. While the invention has been described in conjunction with specific embodiments thereof, various alternatives, modifications and variations will be apparent to those skilled in the art in light of the foregoing description. Accordingly, it is intended to embrace all such alternatives, modifications and variations as fall within the spirit and broad scope of the appended claims.

I claim as my invention:

1. A conjugated diene rubber normally susceptible to oxidation and containing, in an amount sufficient to inhibit such oxidation, a triphenylamine having at least one p-hydroxy group and no additional ring substituents other than alkyl groups.

2. An olefinic gasoline normally susceptible to oxidation and containing, in amount sufficient to inhibit such oxidation, a triphenylamine having at least one p-hydroxy group and no additional ring substituents other than alkyl groups.

3. Composition of claim 1 wherein said conjugated diene rubber is natural rubber.

4. Composition of claim 1 wherein said triphenylamine is p-hydroxy triphenylamine.

5. Composition of claim 1 wherein said triphenylamine is p,p'-dihydroxy triphenylamine.

6. Composition of claim 1 wherein said triphenylamine is p,p',p''-trihydroxy triphenylamine.

7. Composition of claim 1 wherein said triphenylamine is present at a concentration of between about 0.025 and about five parts per 100 parts of conjugated diene rubber.

References Cited

UNITED STATES PATENTS

| | | | |
|---|---|---|---|
| 1,884,889 | 10/1932 | Semon | 260—808 |
| 2,087,199 | 7/1937 | Clifford | 260—809 |
| 2,200,747 | 5/1940 | Howland | 260—809 |
| 2,238,320 | 4/1941 | Hardman | 260—571 |
| 2,407,419 | 9/1946 | Hanford | 260—45.9 |
| 2,915,495 | 12/1959 | Stamatoff | 260—45.9 |
| 3,225,000 | 12/1965 | Welch | 260—45.9 |

HOSEA E. TAYLOR, Jr., Primary Examiner

U.S. Cl. X.R.

252—403; 260—45.9, 808, 814, 571

PO-1050
(5/69)

UNITED STATES PATENT OFFICE
CERTIFICATE OF CORRECTION

Patent No. 3,508,888      Dated April 28, 1970

Inventor(s) Ronald B. Spacht

It is certified that error appears in the above-identified patent and that said Letters Patent are hereby corrected as shown below:

Column 3, line 30, "5.3" should read --5.03--;
         line 32, "Example VI" should read --Example IV--.

Column 4, line 63, under Tensile Strength Aged "1,305" should read --1,350--.

SIGNED AND
SEALED
SEP 29 1970

(SEAL)
Attest:

Edward M. Fletcher, Jr.
Attesting Officer

WILLIAM E. SCHUYLER, JR.
Commissioner of Patents